(12) United States Patent
Ming

(10) Patent No.: US 7,552,540 B2
(45) Date of Patent: Jun. 30, 2009

(54) FLANGE SLOT MAGNET MOUNT FOR AN I-BEAM LEVEL

(76) Inventor: Wu Dong Ming, Dongxiao Industry Zone, Jinhua, Zhejiang (CN)

( * ) Notice: Subject to any disclaimer, the term of this patent is extended or adjusted under 35 U.S.C. 154(b) by 55 days.

(21) Appl. No.: 11/695,941

(22) Filed: Apr. 3, 2007

(65) Prior Publication Data
US 2007/0234581 A1 Oct. 11, 2007

(51) Int. Cl.
G01C 9/18 (2006.01)
G01C 9/26 (2006.01)

(52) U.S. Cl. .......................................... 33/347; 33/371
(58) Field of Classification Search .................. 33/347, 33/370, 371, 377–390, DIG. 1
See application file for complete search history.

(56) References Cited

U.S. PATENT DOCUMENTS

| | | | |
|---|---|---|---|
| 2,535,791 A | 12/1950 | Fluke | |
| 3,180,036 A * | 4/1965 | Meeks, Sr. | 33/347 |
| 3,213,545 A * | 10/1965 | Wright | 33/347 |
| 3,820,249 A | 6/1974 | Stone | |
| 4,168,578 A | 9/1979 | VanderWerf | |
| 4,419,833 A | 12/1983 | Wright | |
| 4,593,475 A | 6/1986 | Mayes | |
| 4,745,689 A | 5/1988 | Hiltz | |
| 4,888,875 A | 12/1989 | Strother | |
| 4,888,880 A | 12/1989 | Parker | |
| 4,947,556 A | 8/1990 | Peil | |
| 4,970,796 A | 11/1990 | Masters et al. | |
| 5,199,177 A | 4/1993 | Hutchins et al. | |
| 5,575,073 A | 11/1996 | von Wedemayer | |
| 5,755,037 A | 5/1998 | Stevens | |
| 5,940,978 A | 8/1999 | Wright et al. | |
| 6,026,581 A | 2/2000 | Gruetzmacher | |
| 6,029,360 A | 2/2000 | Koch | |
| 6,173,502 B1 | 1/2001 | Scarborough | |
| 6,205,669 B1 | 3/2001 | Sollars et al. | |
| 6,354,011 B1 * | 3/2002 | Albrecht | 33/318 |
| 6,439,524 B1 * | 8/2002 | Ettemeyer | 248/309.1 |
| 6,568,095 B2 | 5/2003 | Snyder | |
| 6,675,490 B1 | 1/2004 | Krehel et al. | |
| 6,918,187 B2 | 7/2005 | Schaefer | |
| 6,935,035 B2 * | 8/2005 | Smith | 33/391 |

(Continued)

FOREIGN PATENT DOCUMENTS

JP 11-512821 A * 11/1999

(Continued)

*Primary Examiner*—R. A. Smith
(74) *Attorney, Agent, or Firm*—Boyle Fredrickson, S.C.

(57) ABSTRACT

A level includes a frame defining a web, a flange, and a gauging surface for placement on a workpiece. A magnetic retainer arrangement is secured to the frame laterally of the web and above the flange, and applies a magnetic force to a magnetically attractive workpiece through the laterally extending member. The web includes a lip that cooperates with the web and the flange to define a channel a facing in a direction opposite the gauging surface. The magnetic retainer arrangement includes one or more magnetic members engaged within the channel. The magnetic members are operable to maintain the level in engagement with a magnetically attractive workpiece, by virtue of a magnetic field that passes through the laterally extending member and that applies a magnetic force that acts on the magnetically attractive workpiece to maintain the gauging surface of the level on the workpiece.

11 Claims, 3 Drawing Sheets

U.S. PATENT DOCUMENTS

| | | |
|---|---|---|
| 7,398,600 B2 * | 7/2008 | Ming .......................... 33/347 |
| 2003/0005590 A1 | 1/2003 | Snyder |
| 2004/0143981 A1 | 7/2004 | Krehel et al. |
| 2006/0107541 A1 | 5/2006 | Godinez |
| 2006/0248738 A1 * | 11/2006 | Tran et al. ..................... 33/451 |
| 2006/0283031 A1 * | 12/2006 | Ming .......................... 33/347 |

FOREIGN PATENT DOCUMENTS

WO    WO 2005005925 A1 *    1/2005

* cited by examiner

FLANGE SLOT MAGNET MOUNT FOR AN I-BEAM LEVEL

BACKGROUND AND SUMMARY OF THE INVENTION

This invention relates to a tool such as a level, and more particularly to a magnet mounting feature for a level.

A level generally includes at least one bubble vial secured to a frame or a rail of the level. The bubble vial provides an indication as to the orientation of the level, e.g., relative to a horizontal, vertical, or a diagonal plane. The vial contains a quantity of fluid and a bubble, and the user views the position of the bubble within the vial to ascertain the position of the tool relative to the desired plane. Frequently, it is desirable to determine the orientation of magnetically attractive materials such as beams, rails, posts, hangers, and the like.

To allow hands-free engagement of a level with a magnetically attractive object, some prior art levels provide a magnet attached to an exterior surface of the frame of the level. This provision of a magnetic member in a level presents a number of manufacturing challenges. Firstly, the frame of a magnetic level must include a feature that enables the magnet to be secured to the frame. For example, one prior art construction involves a groove formed in one of the gauging surfaces of the level, and a magnetic strip that is secured within the groove, such as by means of an adhesive. This requires the level manufacturer to produce a level frame that is specifically adapted for use in manufacturing a magnetic level. Since a manufacturer will often include in its product line a magnetic and a non-magnetic version of essentially the same level, the manufacturer must produce one level frame for the magnetic version and one level frame for the non-magnetic version. Secondly, assembly of the magnetic member, such as the magnetic strip, to the frame of the level requires a labor intensive and time-consuming step in the manufacturing process. In addition, the mounting of the magnetic member to the level frame must be accomplished such that the magnetic member does not protrude beyond the gauging surface of the level, such that the magnetic member does not interfere with the accuracy of the level.

The present invention provides a level construction that overcomes the aforementioned drawbacks.

In accordance with one aspect of the invention, a tool such as a level includes a frame defining an upstanding member and a laterally extending member that extends from the upstanding member. The frame defines a gauging surface adapted for placement on a workpiece. Magnetic retainer means is secured to the frame laterally of the upwardly extending member and above the laterally extending member, and is operable to apply a magnetic force to a magnetically attractive workpiece through the laterally extending member. Representatively, the upstanding member may be in the form of a web and the laterally extending member may be in the form of one or more flanges that extend laterally from the web. The laterally extending member may include an upstanding lip at a location spaced from the upstanding member, which cooperates with the web and the laterally extending member to define a channel that faces in a direction opposite that of the gauging surface defined by the laterally extending member. The magnetic means may be in the form of one or more magnetic members engaged within the channel. The one or more magnetic members are operable to maintain the level in engagement with a magnetically attractive workpiece, by virtue of a magnetic field that passes through the laterally extending member and that applies a magnetic force that acts on the magnetically attractive workpiece to maintain the gauging surface of the level on the workpiece.

The one or more magnetic members may be engaged within the channel by means of facing engagement structure formed in the upstanding member and the lip. In one form, one or more magnet carriers include side edges that are engaged with the engagement structure, and one or more magnets are secured to each magnet carrier so that the magnet carriers function to maintain the magnets in engagement with the level frame. The level frame may be formed in an extrusion process, such that that the engagement structure is in the form of a slot or groove in the lip, and a bead or protrusion in the upstanding member, which extend throughout the length of the frame and open unto the ends of the frame. With this construction, the magnet carriers can be engaged within the slots or grooves and slid to a desired position along the length of the frame, and then maintained in axial position on the frame in any satisfactory manner, such as by use of an adhesive or the like.

The invention contemplates a tool such as a level having one or more magnets interconnected with a frame as summarized above, as well as a method of mounting one or more magnets to the frame of a tool such as a level, also in accordance with the foregoing summary.

Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings.

DETAILED DESCRIPTION OF THE INVENTION

Figure 1:
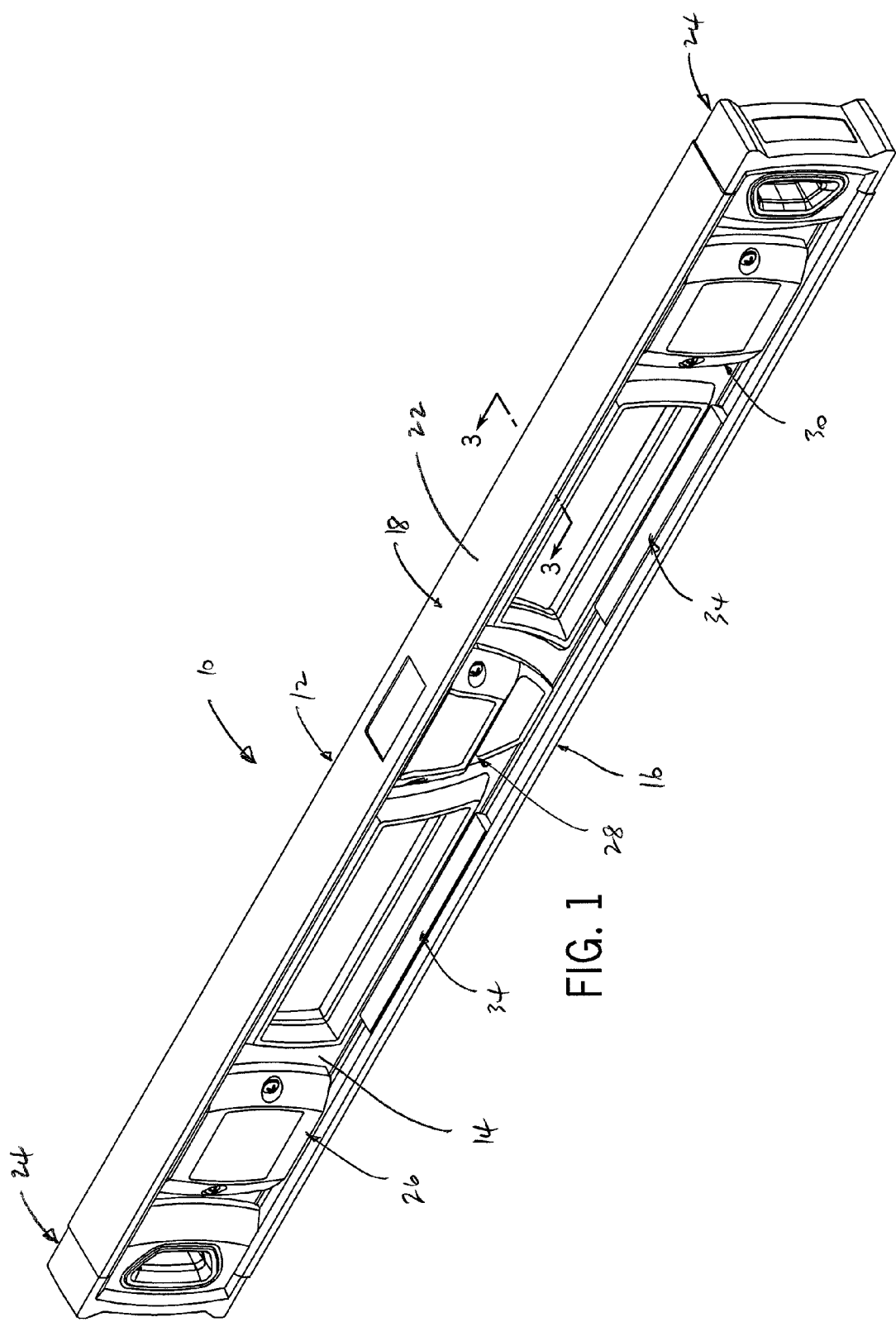
FIG. 1 is an isometric view of a tool such as a level having one or more magnets mounted to the frame of the level, in accordance with the present invention.
Figure 2:
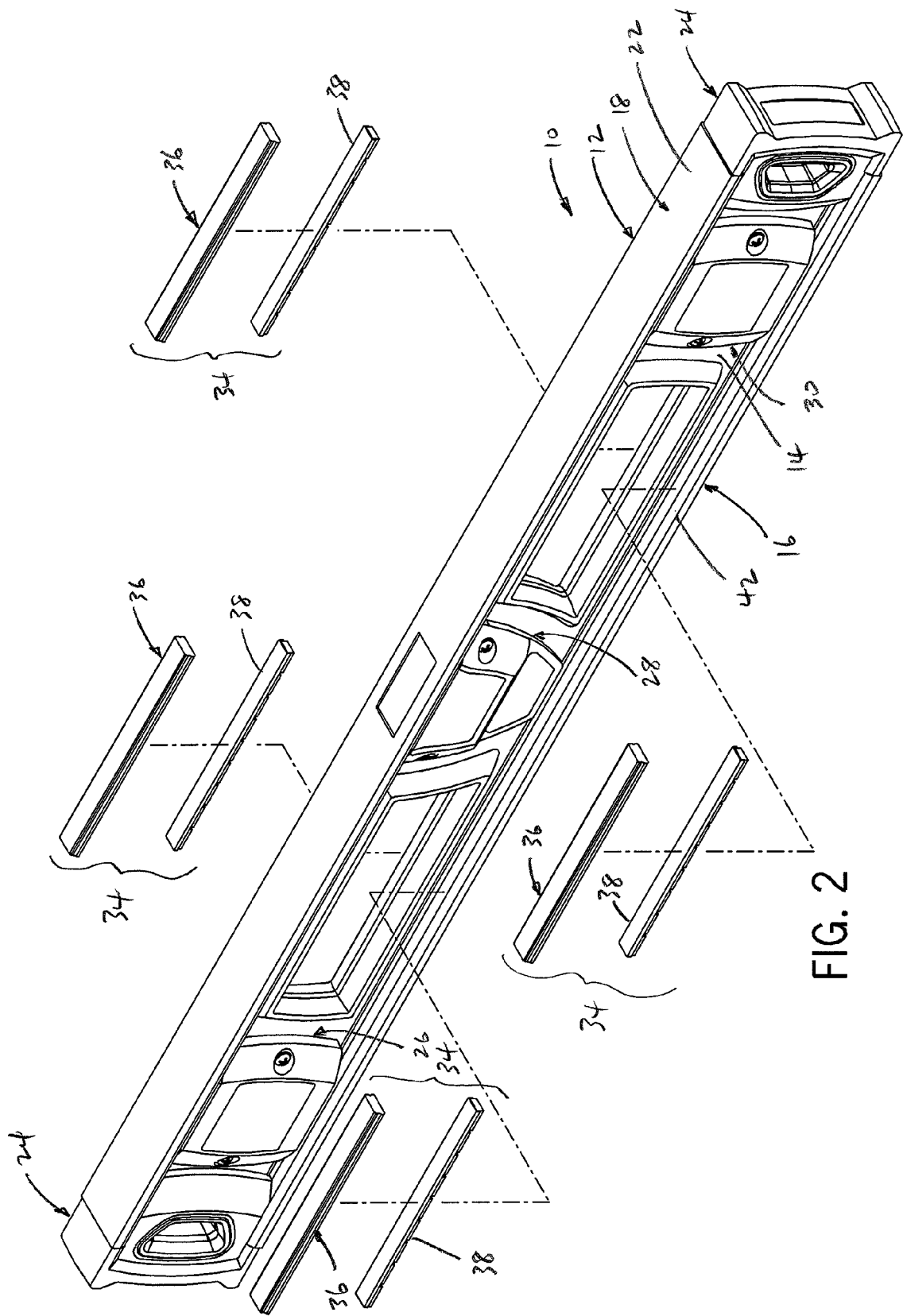
FIG. 2 is an exploded isometric view of the level of FIG. 1, showing the magnets and magnet carriers disengaged from the level frame.
Figure 3:
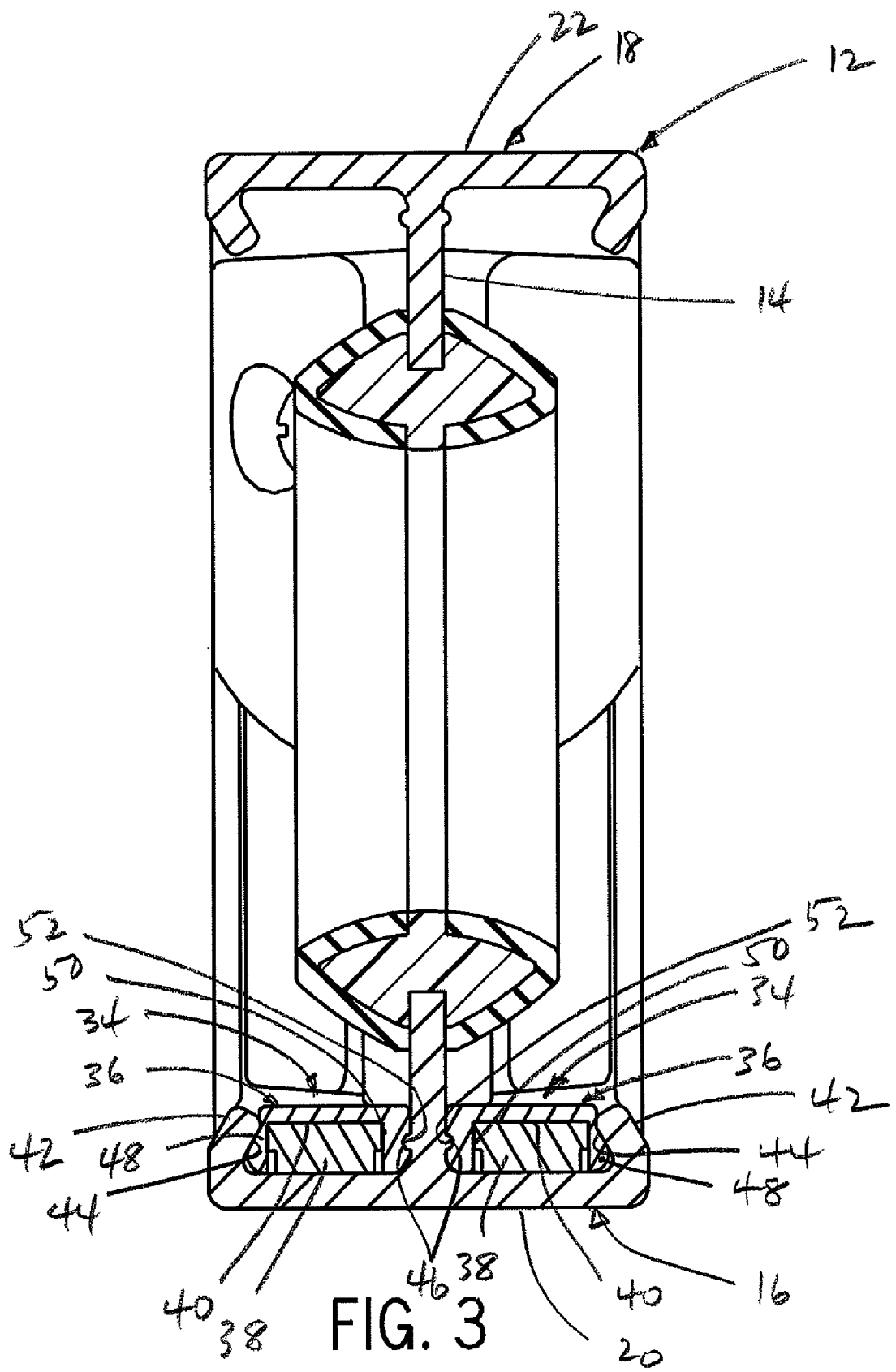
FIG. 3 is a section view taken along line 3-3 of FIG. 1.

Referring to FIGS. 1-3, a tool such as a level 10 includes a frame 12 having at least one upstanding member and a laterally extending member. In the illustrated embodiment, the upstanding member is in the form of a web 14, and the at least one laterally extending member is in the form of a lower flange 16. The frame 12 also includes an upper flange 18. Flanges 16 and 18 are located at the lower and upper ends, respectively, of the web 14, and extend outwardly in opposite directions from web 14. With this construction, web 14 and flanges 16, 18 of frame 12 form an I-shaped cross section. Lower flange 16 defines a lower gauging surface 20, and upper flange 18 defines an upper gauging surface 22. Typically, frame 12 is formed in an extrusion process of a metallic material such as aluminum, although it is understood that any other satisfactory material and forming method may be employed.

A pair of end caps 24 are engaged with the ends of frame 12. A series of vial holders 26, 28 and 30 are engaged with web 14 of frame 12, and function to secure level vials in position on frame 12 to provide a visual indication of the orientation of level 10 relative to a workpiece when one or the other of gauging surfaces 20, 22 is engaged with the workpiece. Typically, the vials retained by vial holders 26, 28 and 20 are oriented to provide a visual indication of the orientation of level 10 relative to level (horizontal), plumb (vertical) and a predetermined angle therebetween, such as 45 degrees.

A series of magnetic members 34 are secured to level frame 12. Magnetic members 34 apply a strong magnetic field that passes through lower flange 16 in order to maintain lower gauging surface 20 in engagement with a magnetically attractive workpiece. Magnetic members such as 34 may also be engaged with level frame 12 adjacent upper flange 18 if desired, although typically only a single set of magnetic members 34 is employed.

Each magnetic member 34 includes a magnet housing or carrier 36 that contains a magnet 38. In a preferred form, each magnet 38 is a strip-type magnet constructed of a rare earth magnetic material, to provide a strong magnetic force that is capable of passing through the lower flange 16 and to firmly and securely engage the level frame 12 with a magnetically attractive workpiece. As shown in FIG. 3, each magnet 38 has a generally rectangular cross section. Each magnet carrier 36 defines a downwardly facing recess 40 within which the magnet 38 is received. The configuration of recess 40 matches that of magnet 38, so that magnet 38 can be press-fit into the recess 40. The depth of recess 40 also generally matches that of magnet 38, so that the lowermost surface of magnet 38 is generally flush with the downwardly facing surface of magnet carrier 36 within which recess 40 is formed. The ends of recess 40 may either be open of closed. If the recess 40 is formed with open ends, the magnet 38 is glued or otherwise positively retained within the recess 40.

Each magnetic member 34 is engaged with the level frame 12 at a location outwardly of web 14 and above lower flange 16, and functions to apply a magnetic force through lower flange 16 without the need to form openings or recesses in lower flange 16. To accomplish this, engagement structure is interposed between frame 12 and each magnetic member 34, which is capable of positively securing the magnetic member 34 to the frame 12 in a desired position adjacent lower flange 16. In the illustrated embodiment, the engagement structure between frame 12 and each magnetic member 34 includes an upstanding member that extends upwardly from lower flange 18 at a location spaced outwardly from the facing surface of web 14. In the illustrated embodiment, the upstanding member is in the form of a lip 42 that extends upwardly from each outer end of the lower flange 16. Each lip 42 is configured to define an inner surface 44 that is oriented at an acute angle relative to the upwardly facing surface of lower flange 16, to provide an undercut-type recess at each outer end of the lower flange 16. In addition, each side of web 14 is formed with an outwardly-facing protrusion or bead 46 located slightly above the adjacent upper surface of lower flange 16. Magnet carrier 36 is formed with an outer wall 48 having a cross section that matches the undercut recess defined by the inner surface of lip 42 and the upwardly facing surface of lower flange 16. Magnet carrier 36 also includes an inner wall 50 having a groove 52 with a cross section that matches bead 46. In this manner, each magnetic member 34 is maintained in position on level frame 12 by engagement of magnet carrier outer wall 48 within the undercut recess defined by lip 42, in combination with engagement of bead 48 in groove 52 of magnet carrier inner wall 50.

By forming level frame 12 in an extrusion process, bead 46 and the undercut recess defined by lip 42 extend throughout the entire length of the level frame 12 and open onto the ends of level frame 12. After magnets 38 are positioned in the downwardly facing recesses 40 of the magnet carriers 36, each magnet carrier 36 may be engaged with the frame 12 at the end of frame 12 and slid to a desired axial position on frame 12 by movement of the magnet carrier outer wall 48 in the undercut recess defined by lip 42 and by movement of groove 52 of magnet carrier inner wall 50 on bead 46. When the magnetic member 34 is in a desired axial position on frame 12, the magnetic member 34 is maintained in position using an adhesive or any other satisfactory bonding method. Alternatively, magnet carriers 36 may be formed of a resilient material that enables each magnetic member 34 to be snapped in place on level frame 12. To accomplish this, the outer wall 48 of each magnet carrier 36 is first positioned in the undercut recess defined by lip 42, and the inner end of the magnet carrier 36 is pushed downwardly toward lower flange 16 so that bead 46 snaps into groove 52 in magnet carrier inner wall 50. Again, if desired, an adhesive or other bonding agent may be employed to ensure that the magnetic member 34 is maintained in a desired position along the length of frame 12.

The construction of level 10 as shown and described thus utilizes low profile, strong magnets that are positioned on the frame in a location close to the gauging surface. This provides a magnetic level having a very strong holding force, without the need to significantly alter the structure of the level frame to accommodate the magnets that apply the holding force. The frame can also be used without modification to form a non-magnetic level, which is not the case with prior art magnetic level frames which typically include an opening or groove within which the magnetic member is located.

In the illustrated embodiment, two sets of magnetic members 34 are shown as being engaged with level frame 12, and each set includes a pair of magnetic members 34 located one on each side of web 14. It is understood that any number of magnetic members 34 may be employed, and that the magnetic members 34 may be arranged in any satisfactory configuration on frame 12.

While the invention has been shown and described with respect to a particular embodiment, it is understood that various alternatives and modifications are possible and are contemplated as being within the scope of the present invention. For example, and without limitation, the channel within which the magnetic members are engaged may be formed by any satisfactory structure associated with level frame 12, and need not be formed by any portion of web 14. In addition, any satisfactory engagement structure may be interposed between the magnetic members and the areas of the web that form the channel within which the magnetic members are received. While the magnets are shown as being separate from the magnet carriers, it is also contemplated that the magnet carriers may be eliminated and the magnets may be formed with the engagement structure that secures the magnets in position on the frame. The magnetic members may be separate members that are mounted in discrete locations on the frame, as shown, or may extend throughout the entire length of the frame, if desired. The present invention may be incorporated in a tool other than a level, in the event it is desirable for the tool to be engageable with a workpiece or the like in a hands-free manner. The tool may have flanges that extend in opposite directions from the web of the frame, as shown, or may have a single flange or other laterally extending member that defines the gauging surface. The gauging surface may be flat and planar, as shown and described, or may have any other satisfactory configuration and orientation.

Various alternatives and embodiments are contemplated as being within the scope of the following claims particularly pointing out and distinctly claiming the subject matter regarded as the invention.

I claim:

1. A tool, comprising:
    an I-shaped frame having an upstanding web and a flange that laterally extends from the web, wherein the flange defines gauging surface adapted for placement on a work surface, and an inner surface facing opposite the gauging surface; and
    magnetic means secured to the frame laterally of the web and above the inner surface defined by the flange when the gauging surface is facing downwardly, wherein the magnetic means is operable to apply a magnetic force to a magnetically attractive work surface through the flange; and
    wherein the frame includes a channel arranged laterally of the web and inwardly of the flange and wherein the magnetic means is engaged within the channel, wherein the channel is defined by the inner surface of the flange in combination with a laterally facing surface of the web and a lip associated with the flange that is spaced from the web, wherein the lip and the web define a facing engagement structure, and wherein the magnetic means is engaged with the facing engagement structure; and
    wherein the magnetic means and the engagement structure are configured so as to enable the magnetic means to be moved axially relative to the frame.

2. The tool of claim 1, wherein the tool comprises a level, and wherein the magnetic means comprises one or more magnetic members located one on each side of the web inwardly of the flange.

3. A tool, comprising:
    an I-shaped frame having an upstanding web and a flange that laterally extends from the web, wherein the flange defines a gauging surface adapted for placement on a work surface, and an inner surface facing opposite the gauging surface; and
    magnetic means secured to the frame laterally of the web and above the inner surface defined by the flange when the gauging surface is facing downwardly, wherein the magnetic means is operable to apply a magnetic force to a magnetically attractive work surface through the flange;
    wherein the frame includes a channel arranged laterally of the web and inwardly of the flange, wherein the channel is defined at least in part by the inner surface of the flange, and wherein the magnetic means is engaged within the channel; and
    wherein the magnetic means comprises one or more magnet carriers having at least one recess facing the gauging surface and one or more magnets located within the at least one recess, wherein the one or more magnets face the inner surface defined by the flange when located within the at least one recess of the magnet carrier.

4. A tool, comprising:
    an I-shaped frame including a laterally extending member that defines an outwardly facing surface adapted for engagement with a work surface; and
    a magnetic retainer arrangement carried by the frame and operable to apply a magnetic force to a magnetically attractive work surface through the laterally extending member, wherein the magnetic retainer arrangement is located inwardly of the outwardly facing surface of the laterally extending member and is secured to the frame via engagement structure interposed between the frame and the magnetic retainer arrangement.

5. The tool of claim 4, wherein the frame includes a web that extends from the laterally extending member in a direction opposite the gauging surface, and wherein the engagement structure is associated with the laterally extending member and the web.

6. The tool of claim 5, wherein the laterally extending member and the web define a channel within which the magnetic retainer arrangement is located, and wherein the channel is defined by the web and the laterally extending member.

7. The tool of claim 6, wherein the laterally extending member includes an upstanding portion spaced from the web, wherein the upstanding portion and the web cooperate with an inner surface facing opposite the gauging surface and defined by the laterally extending member to define the channel.

8. The tool of claim 6, wherein the magnetic retainer arrangement and the engagement structure are configured so as to enable the magnetic means to be moved axially relative to the frame.

9. The tool of claim 4, wherein the magnetic retainer arrangement comprises a magnet carrier having at least one recess facing the gauging surface and a magnet located within the recess, wherein the magnet faces an inwardly facing surface defined by the laterally extending member when located within the recess of the magnet carrier.

10. The tool of claim 4, wherein the magnetic retainer arrangement comprises one or more magnet carriers having at least one recess facing the gauging surface and one or more magnets located within the at least one recess, wherein the one or more magnets face an inwardly facing surface defined by the laterally extending member when located within the at least one recess of the magnet carrier.

11. A tool, comprising:
    an I-shaped frame having an upstanding web and a flange that laterally extends from the web, wherein the flange defines a gauging surface adapted for placement on a work surface, and a inner surface facing opposite the gauging surface; and
    magnetic means secured to the frame laterally of the web and above the inner surface defined by the flange when the gauging surface is facing downwardly, wherein the magnetic means is operable to apply a magnetic force to a magnetically attractive work surface through the flange; and
    wherein the frame includes a channel arranged laterally of the web and inwardly of the flange, wherein the channel is defined at least in part by the inner surface of the flange, and wherein the magnetic means is engaged within the channel;
    wherein the magnetic means comprises a magnet carrier having at least one recess facing the gauging surface and a magnet located within the recess, wherein the magnet faces an inwardly facing surface defined by the flange when located within the recess of the magnet carrier.

* * * * *